(12) United States Patent
Laur et al.

(10) Patent No.: US 10,896,514 B2
(45) Date of Patent: Jan. 19, 2021

(54) OBJECT TRACKING AFTER OBJECT TURNS OFF HOST-VEHICLE ROADWAY

(71) Applicant: Aptiv Technologies Limited, St. Michael (BB)

(72) Inventors: Michael H. Laur, Mission Viejo, CA (US); Nandita Mangal, Palo Alto, CA (US); Divya Balachandran, Sunnyvale, CA (US)

(73) Assignee: Aptiv Technologies Limited, St. Michael (BB)

( * ) Notice: Subject to any disclaimer, the term of this patent is extended or adjusted under 35 U.S.C. 154(b) by 136 days.

(21) Appl. No.: 16/010,678

(22) Filed: Jun. 18, 2018

(65) Prior Publication Data

US 2019/0385317 A1 Dec. 19, 2019

Related U.S. Application Data

(60) Provisional application No. 62/685,617, filed on Jun. 15, 2018.

(51) Int. Cl.
*G06T 7/292* (2017.01)
*B60W 30/095* (2012.01)
(Continued)

(52) U.S. Cl.
CPC ......... *G06T 7/292* (2017.01); *B60W 30/0956* (2013.01); *G05D 1/0088* (2013.01);
(Continued)

(58) Field of Classification Search
CPC ....... B60Q 5/006; B60W 10/04; B60W 10/18; B60W 10/20; B60W 10/30;
(Continued)

(56) References Cited

U.S. PATENT DOCUMENTS 9,248,834 B1 * 2/2016 Ferguson .............. B60W 30/09
9,495,874 B1 * 11/2016 Zhu ........................ G06N 20/00
(Continued)

FOREIGN PATENT DOCUMENTS

WO 2017/095614 A1 6/2017

OTHER PUBLICATIONS

European Search Report for Application No. 19177125.2, European Patent Office, dated Oct. 8, 2019.

*Primary Examiner* — Jaime M Holliday
(74) *Attorney, Agent, or Firm* — Colby Nipper PLLC

(57) ABSTRACT

A system for operating a vehicle includes an object-detector and a controller-circuit. The object-detector is used to track an object traveling on a roadway traveled by a host-vehicle. The controller-circuit is in communication with the object-detector. The controller-circuit is configured to track a position of the object, and determine a classification of the object in accordance with a signal received from the object-detector. The classification includes a car and a bicycle. The controller-circuit is configured to track the car a first-distance after the car turns off the roadway, track the bicycle a second-distance after the bicycle turns off the roadway, where the second-distance is greater than the first-distance, and operate the host-vehicle in accordance with the position of the object.

18 Claims, 3 Drawing Sheets

(51) Int. Cl.
*G05D 1/00* (2006.01)
*G05D 1/02* (2020.01)
*G06K 9/00* (2006.01)
*G01S 13/86* (2006.01)
*B60W 50/00* (2006.01)
*G01S 13/72* (2006.01)
*B62D 15/02* (2006.01)

(52) U.S. Cl.
CPC ....... G05D 1/0253 (2013.01); G06K 9/00805 (2013.01); *B60W 50/00* (2013.01); *B60W 2050/0075* (2013.01); *B62D 15/025* (2013.01); *G01S 13/72* (2013.01); *G01S 13/862* (2013.01); *G01S 13/865* (2013.01); *G01S 13/867* (2013.01); *G05D 2201/0213* (2013.01); *G06T 2207/30261* (2013.01)

(58) Field of Classification Search
CPC ......... B60W 2550/10; B60W 2550/30; B60W 2710/18; B60W 2710/20; B60W 2710/30; B60W 2720/10; B60W 30/08; B60W 30/0953; B60W 30/0956; G01C 21/3484; G01C 21/36; G01C 21/3697; G05D 1/0088; G06K 9/00805; G08G 1/005; G08G 1/0112; G08G 1/0129; G08G 1/0141; G08G 1/162; G08G 1/164; G08G 1/165; G08G 1/166
See application file for complete search history.

(56) References Cited

U.S. PATENT DOCUMENTS

| | | | |
|---|---|---|---|
| 9,779,621 | B1* | 10/2017 | Urmson ............... G08G 1/0141 |
| 2017/0120902 | A1 | 5/2017 | Kentley et al. |
| 2017/0203758 | A1* | 7/2017 | Mukai ............... B60W 30/0956 |
| 2017/0268896 | A1 | 9/2017 | Bai et al. |
| 2018/0001819 | A1* | 1/2018 | Imbe ...................... B60R 21/00 |
| 2018/0126902 | A1* | 5/2018 | Seo ........................ B60Q 1/525 |

* cited by examiner

OBJECT TRACKING AFTER OBJECT TURNS OFF HOST-VEHICLE ROADWAY

TECHNICAL FIELD OF INVENTION

This disclosure generally relates to a system for operating a vehicle, and more particularly relates to a system that tracks the car a first-distance after the car turns off the roadway, and tracks the bicycle a second-distance after the bicycle turns off the roadway, where the second-distance is greater than the first-distance.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
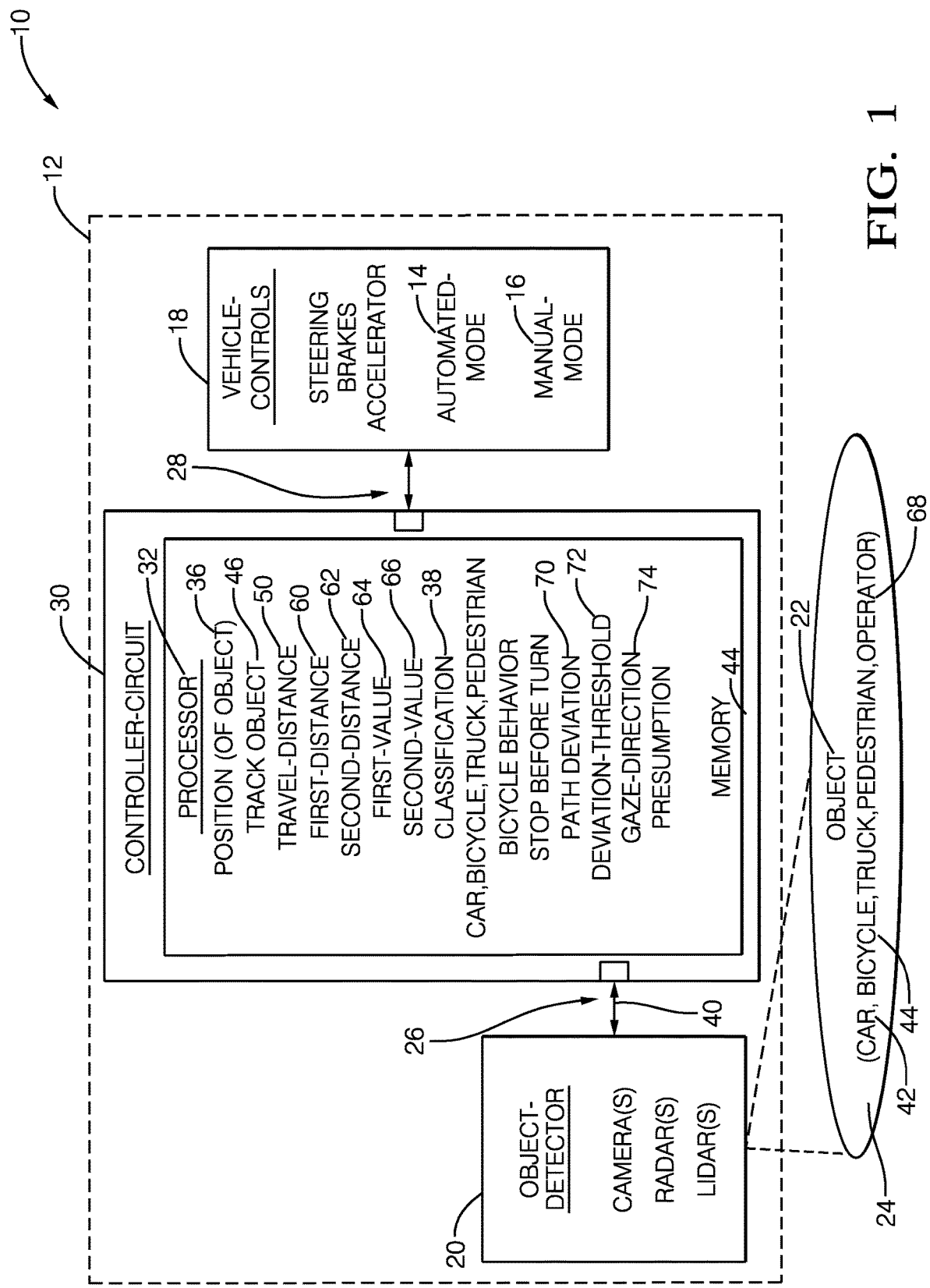
FIG. 1 is diagram of a system for operating a vehicle in accordance with one embodiment.

FIG. 1 illustrates a non-limiting example of a system 10 for operating a vehicle, e.g. a host-vehicle 12. The host-vehicle 12 may be characterized as an automated vehicle. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination to operate the host-vehicle 12, and computer operates the vehicle-controls 18 (e.g. steering, brakes, accelerator) of the host-vehicle 12. However, full automation is not a requirement. It is contemplated that the teachings presented herein are useful when the host-vehicle 12 is operated in a manual-mode 16 where the degree or level of automation may be little more than providing an audible or visual warning to a human-operator who is generally in control of the steering, accelerator, and brakes of the host-vehicle 12. For example, the system 10 may merely assist the human-operator as needed to avoid interference with and/or a collision with, for example, an object 22 such as an other-vehicle, or a person riding a bicycle.

The system 10 includes an object-detector 20 that may include, but is not limited to, one or more instances of a camera, a radar, a lidar, an ultrasonic-transducer, or any combination thereof. The object-detector 20 is used to track an object 22 such as, but not limited to, a car, a truck, a motorcycle, a bicycle, a walking or running pedestrian, or a skateboarder traveling on a roadway 24 traveled by a host-vehicle. While use of the object-detector 20 is not limited to detecting only instances of objects traveling on the roadway 24, the area of interest of the system 10 described herein is generally limited to moving objects that share the roadway 24 with the host-vehicle 12, as will become apparent in the description below. That is, an object traveling on a sidewalk adjacent the roadway is not included in the one or more instances of the object 22 which is/are characterized as traveling on the roadway 24.

The system 10 includes a controller-circuit 30 in communication with the object-detector 20 via an input 26 and in communication with the vehicle-controls 18 via an output 28. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for tracking one or more instances of the object 22 based on signals received by the controller 30 from the object-detector 20.

The controller-circuit 30 is configured (e.g. programmed) to track 46 a position 36 of the object 22. The position 36 may be expressed in term of, for example but not limited to, a distance and direction relative to host-vehicle 12, a distance from the host-vehicle 12 and a relative position with respect to a travel-path or travel-lane (e.g. centered or distance left or right of a centerline) of the host-vehicle 12, or in world-coordinates, e.g. latitude, longitude, elevation. The position 36 may also include a relative speed or closing-rate, i.e. how fast the object is moving toward or away from the host-vehicle 12, and/or a time-to-collision if the object 22 and the host-vehicle 12 have intersecting trajectories.

The controller-circuit 30 is also configured (e.g. programmed) to determine a classification 38 of the object 22 in accordance with (i.e. based on) a signal 40 received from the object-detector 20. The classification 38 includes, but is not limited to, a car 42 and a bicycle 44. The signal 40 may consist of or may include a video, a radar-map, a point-cloud, or any combination thereof, depending on the configuration of the object-detector 20. Those in the object detection arts will recognized that there are numerous ways to determine the classification 38 such as, but not limited to, comparing an image of the object 22 to a catalog or collection of stored images, or comparing a radar-map from the radar to a catalog or collection of stored radar-maps. Alternatively, or additionally, the object 22 may broadcast an identification using dedicated-short-range-communications (DSRC) that is received by a transceiver (not shown) on the host-vehicle 12, as will be recognized by those in the art.

The controller-circuit 30 (or the processor 32) is also configured (e.g. programmed) to track 46 the object 22, i.e. to record the signal 40 to keep a record of the position 36 of the object 22, possibly on a periodic basis such as every eighty milliseconds (80 ms), for example. This tracking of one or more instance of the object 22 may include assigning an identification number to each instance of the object 22 so multiple instances of the object 22 can be independently tracked, as will be recognized by those in the art.

Figure 2:
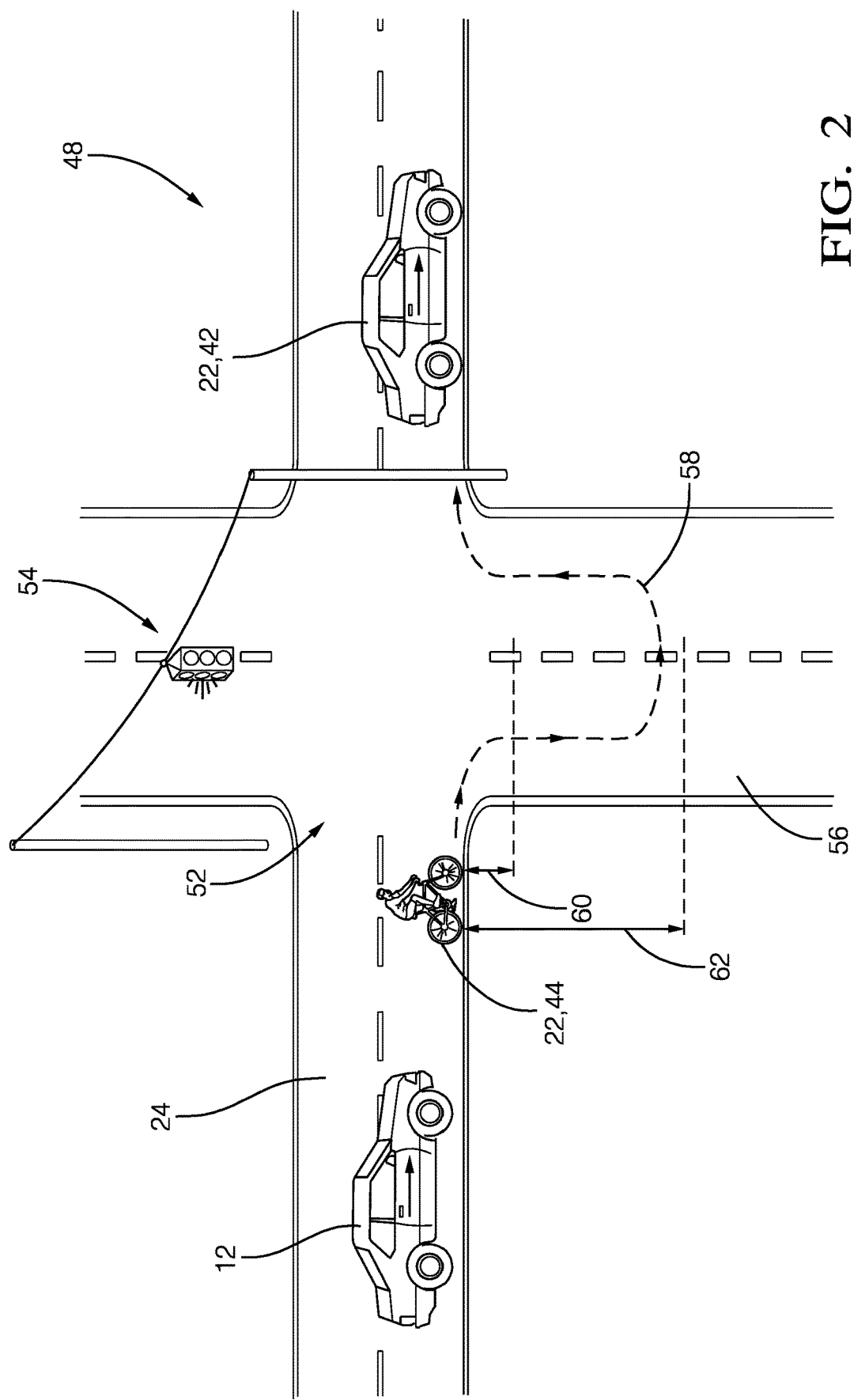
FIG. 2 is an illustration of a scenario encountered by the system of FIG. 1 in accordance with one embodiment.

FIG. 2 illustrates a non-limiting example of a scenario 48 that may be encountered by the system 10. In this example, the host-vehicle 12 and two instances of the object 22, the bicycle 44 and the car 42, are traveling on the roadway 24. The car 42 passed through the intersection 52 while the traffic-light 54 was green, but the traffic-light 54 turned red before the bicycle 44 and the host-vehicle 12 entered the intersection 52. Situations have been observed where the bicycle 44 turned off the roadway 24 onto a side-street 56, and soon thereafter perform a U-turn 58, apparently doing so to avoid having to stop in compliance with the traffic-light 54. In prior examples of comparable systems, an instance of the object 22 would only be tracked while the object 22 was on the same instance of the roadway 24 or travel-path of the host-vehicle 12. That is, prior systems would stop tracking an instance of the object 22 as soon as the object 22 turned off the roadway 24 onto, for example, the side-street 56 that intersects the roadway 24.

Because of this possible future behavior of some instances of the bicycle 44, the controller 30 or the processor 32 is configured to track selected instances of the object 22 a selected distance after the object 22 turns off the roadway 24. For example, the system 10 may track the car 42 a first-distance 60, e.g. three meters (3 m) or zero meters, after the car 42 turns off the roadway (Note: the car is not shown turning in FIG. 2), and track the bicycle 44 a second-distance 62, e.g. fifteen meters (15 m) after the bicycle 44 turns off the roadway 24. In other words, the controller 30 or the processor 32 may be programmed to track the object 22 a travel-distance 50 after the object 22 has turned off the roadway 24, where the travel-distance 50 is first-distance 60 when the object 22 is the car 42, and the travel-distance 50 is the second-distance 62, which is greater than the first-distance 60, when the object 22 is the bicycle 44. The second-distance 62 is greater than the first-distance 60 because the expected behavior of the bicycle 44 after making the turn is different from the expected behavior of a car making a similar turn. By way of further example, it is contemplated that a skate-boarder or a running-pedestrian on the roadway is more likely than a car or a truck to perform a U-turn soon after making a turn of the roadway 24, so the distance that a skate-boarder or a running-pedestrian is tracked after turning off the roadway 24 is advantageously greater than the distance a car or a truck is tracked. The advantage of doing extra distance tracking of certain classifications of objects is that the system 10 does not need any extra time to reestablish tracking of the object if the U-turn 58 is unexpectedly performed or executed.

The system 10 also operates the host-vehicle 12 in accordance with the position of the object 22. During autonomous operation in the automated-mode 14, the system 10 may operate the host-vehicle 12 in a manner that assumes the bicycle 44 will turn-around and come back to the roadway 24. That is, the controller-circuit 30 is configured to operate the host-vehicle 12 in accordance with a presumption that the bicycle 44 will turn-around and re-enter the roadway 24 before the bicycle 44 travels the second-distance 62 after the bicycle 44 turns off the roadway. For example, the system 10 will continue to track the bicycle 44 up to the second-distance 62 away from the roadway 24. This may result in unnecessary computational burden on the controller 30 or the processor 32 if the bicycle 44 does not execute the U-turn 58, i.e. does not turn-around. However, if the bicycle 44 does turn around, any risk of acquisition delay by the tracking algorithms will be avoided. Operating the host-vehicle 12 in accordance with a presumption that the bicycle 44 will turn-around and re-enter the roadway 24 may include leaving enough space between the host-vehicle 12 and the car 42 shown in FIG. 2 so the bicycle 44 can re-enter the roadway 24 if the bicycle 44 does turn-around after turning onto the side-street 56.

By way of another non-limiting example, the controller-circuit 30 may be configured to wait to enter the intersection 52 until after the bicycle 44 travels beyond the second-distance 62 away from the intersection when or after the bicycle 44 turns off the roadway 24 at the intersection 52. It is recognized that selection of what value to use for the second-distance 62 will be important to minimize situations where the host-vehicle 12 obstructs traffic by unnecessarily waiting to enter the intersection 52. It is contemplated that the second-distance 62 may be a dynamic value that is learned or adjusted in accordance with observed instances of the bicycle 44 turning around well before whatever is the present value of the second-distance 62.

It is also contemplated that the behavior of the bicycle 44 before turning off the roadway 24 may be an indication of the probability of the bicycle 44 subsequently performing a U-turn and re-entering the roadway 24. For example, if the bicycle 44 stops before turning, that may be an indication that the bicycle stopped and then decided to 'by-pass' the traffic-light 54 by following the path of the U-turn 58 in FIG. 2. By contrast, if the bicycle 44 does not stop before turning off the roadway 24, that may be interpreted to be an indication that the bicycle 44 intended to make the turn well before encountering the traffic-light 54. Accordingly, the controller-circuit 30 may be configured to set the second-distance 62 to a first-value 64 (e.g. 15 meters) in response to a determination that the bicycle 44 stopped before the bicycle 44 turns off the roadway 24, and set the second-distance 62 to a second-value 66 (e.g. 11 meters) in response to a determination that the bicycle 44 did not stop before the bicycle 44 turns off the roadway 24. Of course, it is expected that the first-value 64 is different from the second-value 66, for example that the first-value 64 is greater than the second-value 66 as suggested above.

It is also contemplated that the behavior of the bicycle 44 after turning off the roadway 24 may be an indication of the probability of the bicycle 44 performing the U-turn 58 and re-entering the roadway 24. For example, if the bicycle 44 is going slow after turning, possibly weaving in indecision, and/or an operator 68 of the bicycle 44 is looking back towards the intersection 52 and/or other traffic on the side-street 56, that may be an indication that the operator 68 does not intend to continue traveling on the side-street 56. By way of example and not limitation, the controller-circuit 30 may be configured to determine a path-deviation 70 from a straight-line by the bicycle, and increase the second-distance 62 in response to a determination that the path-deviation 72 is greater than a deviation-threshold 72, e.g. one meter (1 m). That is, if a straight-line is projected through the recorded or tracked path of the bicycle 44 after the bicycle 44 completes the turn on to the side-street 56, and the maximum difference between the left-most and right-most deviation (i.e. the path-deviation 70) from that straight-line is greater than the deviation-threshold 72, then that may be interpreted as an indication that the operator 68 is contemplating making the U-turn 58, so the second-distance 62 should be increased until the U-turn 58 occurs or the path-deviation for some distance is substantially less than the deviation-threshold 72, e.g. less than 0.5 m.

By way of another example and not limitation, the controller-circuit 30 (or the processor 32) may be configured to determine a gaze-direction 74 of the operator 68 of the bicycle 44 by, for example, analyzing images from the camera. If the gaze-direction 74 is something other than looking forward, e.g. looking around or looking back toward the intersection 52, the controller 30 may increase the second-distance 62 in response to a determination that the gaze-direction 74 is characterized as not looking forward.

Figure 3:
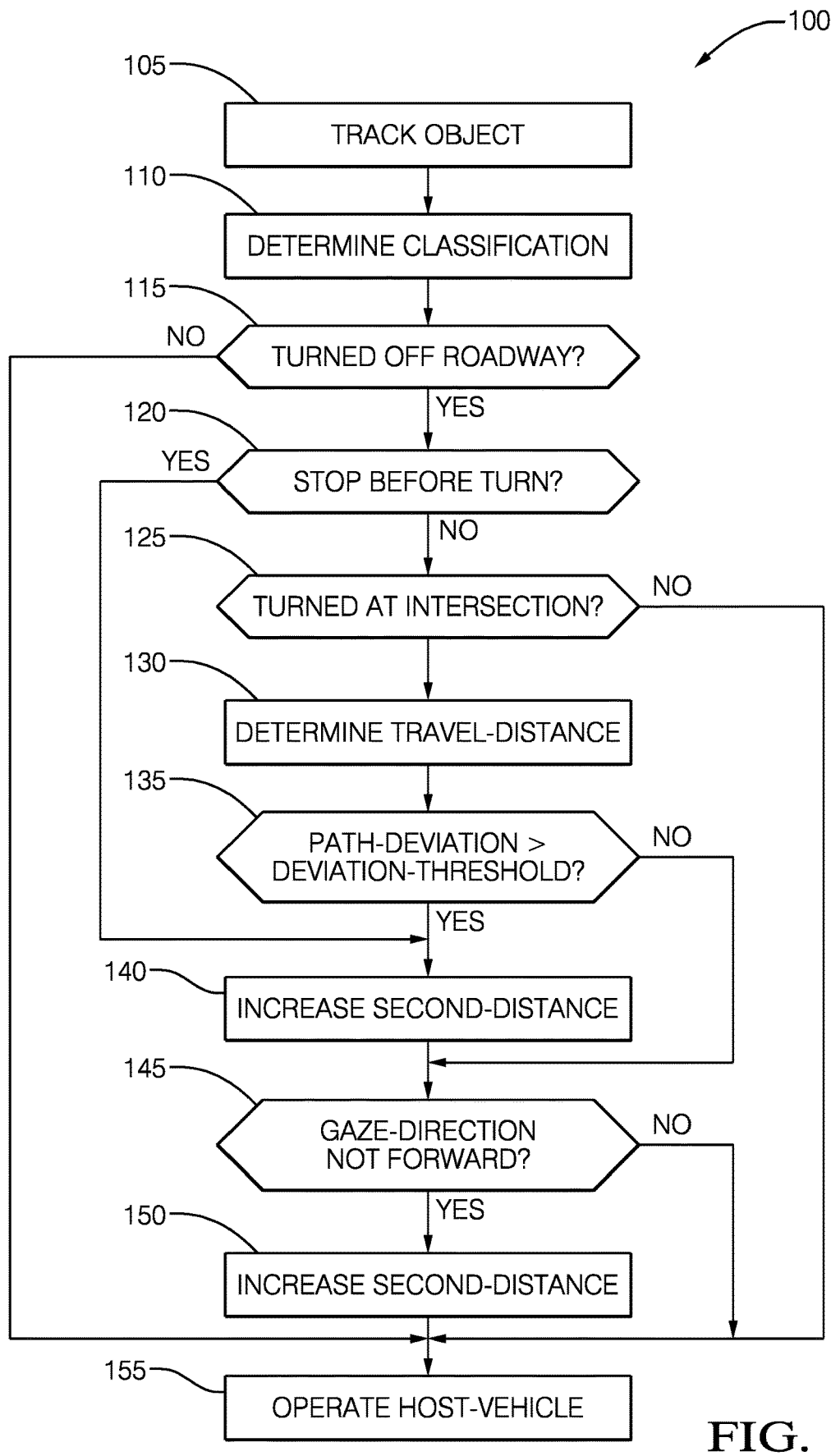
FIG. 3 is a method of operating the system of FIG. 1 in accordance with one embodiment.

FIG. 3 illustrates a non-limiting example of a method 100 of operating a vehicle, e.g. the host-vehicle 12.

Step 105, TRACK OBJECT, may include tracking, using an object-detector 20, an object 22 traveling on a roadway 24 traveled by a host-vehicle 12. The step may also include tracking of the object 22 a travel-distance 50 after the object 22 has turned off the roadway 24, where the travel-distance 50 is first-distance 60 when the object 22 is the car 42 and a second-distance 62 greater than the first-distance 60 when the object 22 is the bicycle 44.

Step 110, DETERMINE CLASSIFICATION, may include determining, using the controller 30 or the processor 32, a classification 38 of the object 22 in accordance with a signal 40 received from the object-detector 20. Options for the classification 38 include, but are not limited to a car 42 and a bicycle 44.

Step 115, TURNED OFF ROADWAY?, may include determining that the object 22 has turned off the roadway 24 traveled by the host-vehicle 12. The method 100 includes operating the host-vehicle 12 in accordance with the position 36 of the object 22. In the situation where the object 22 is the bicycle 44 and has turned off the roadway 24, the method 100 may include operating operate the host-vehicle 12 in accordance with a presumption that the bicycle 44, will turn-around and re-enter the roadway 24 before the bicycle 44 travels the second-distance 62 after the bicycle 44 turns off the roadway 24

Step 120, STOP BEFORE TURN?, may include determining if the bicycle 44 stopped at the intersection 52 before making the turn, and operating the host-vehicle 12 in accordance with the position 36 of the object 22, which includes setting the second-distance 62 to a first-value 64 in response to a determination that the bicycle 44 stopped before the bicycle 44 turns off the roadway 24, and setting the second-distance 62 to a second-value 66 in response to a determination that the bicycle 44 did not stop before the bicycle 44 turns off the roadway 24. It is expected that the first-value 64 is different from the second-value 66, and for example that the first-value 64 may be greater than the second-value 66.

Step 125, TURN AT INTERSECTION?, may include operating the host-vehicle 12 in accordance with the position 36 of the object 22 includes waiting to enter an intersection 52 until after the bicycle 44 travels the second-distance 62 away from the intersection 52 when the bicycle 44 turns off the roadway 24 at the intersection 52.

Step 130, DETERMINE TRAVEL-DISTANCE, may include determine the travel-distance 50 that the object will be tracked based on any combination factors such as, but not limited to the classification 38 of the object 22, if the object 22 is a bicycle 44 then optionally observed behavior of the bicycle 44 before and after the turn, and/or behavior of the operator 68 (e.g. the gaze-direction 74) before or after the turn.

Step 135, PATH-DEVIATION>DEVIATION-THRESHOLD?, may include determining a path-deviation 70 from a straight-line by the bicycle 44, and increasing the second-distance 62 in response to a determination that the path-deviation 70 is greater than a deviation-threshold 72. That is, the travel-distance 50 may be revised after the turn is completed if the bicycle 44 weaves rather than travels in a relatively straight line.

Step 140, INCREASE SECOND-DISTANCE, may include increasing the travel-distance 50 that the bicycle 44 is tracked based on the outcome of prior tests or observations.

Step 145, GAZE-DIRECTION NOT FORWARD?, may include determining a gaze-direction 74 of an operator 68 of the bicycle 44; and increasing the second-distance 62 in response to a determination that the gaze-direction 74 is characterized as not looking forward. That is, if the operator is, for example, looking back toward the intersection 52 after making the turn onto the side street 56, that may be interpreted to be an indication that the operator is preparing to make the U-turn 58.

Step 150, INCREASE SECOND-DISTANCE, may include increasing the travel-distance 50 that the bicycle 44 is tracked based prior tests or observations.

Step 155, OPERATE HOST-VEHICLE, may include operating the host-vehicle 12 in accordance with the position 36 of the object 22 such as not entering the intersection 52 until the bicycle 44 has traveled past the second-distance 62

Described herein is a first device 30 that includes one or more processors 32; memory 34; and one or more programs 105-155 stored in memory 34. The one or more programs 105-155 including instructions for performing all or part of the method 100. Also described herein is a non-transitory computer-readable storage-medium 34 that includes one or more programs 105-155 for execution by one or more processors 32 of a first device 30, the one or more programs 105-155 including instructions which, when executed by the one or more processors 32, cause the first device 30 to perform all or part of the method 100.

Accordingly, a system 10, a controller 30 for the system 10, and a method 100 of operating the system 10 are provided. The system 10, the controller 30, and the method 100 are generally configured to operate the host-vehicle 12 under the assumption that people riding bicycles are more likely that cars or trucks to perform maneuvers such as the U-turn 58 on the side-street 56 to avoid having to wait for a traffic-light to turn green.

While this invention has been described in terms of the preferred embodiments thereof, it is not intended to be so limited, but rather only to the extent set forth in the claims that follow.

We claim:

1. A system for operating a vehicle, said system comprising:
   an object detector used to track an object traveling on a roadway traveled by a host vehicle; and
   a controller circuit in communication with the object detector, said controller circuit configured to track a position of the object, determine a classification of the object in accordance with a signal received from the object detector, wherein the classification comprises a car and a bicycle, said controller circuit configured to track the car a first distance after the car turns off the roadway, track the bicycle a second distance after the bicycle turns off the roadway, wherein the second distance is greater than the first distance, and operate the host vehicle in accordance with the position of the object; wherein the controller circuit is configured to operate the host vehicle in accordance with a presumption that the bicycle will turn around and re-enter the roadway before the bicycle travels the second distance after the bicycle turns off the roadway,
   wherein the controller circuit is further configured to operate the host vehicle to leave space for the bicycle to re-enter the roadway ahead of the host vehicle.

2. The system in accordance with claim 1, wherein the controller circuit is configured to wait to enter an intersection until after the bicycle travels the second distance away from the intersection when the bicycle turns off the roadway at the intersection.

3. The system in accordance with claim 1, wherein the controller circuit is configured to set the second distance to a first value in response to a determination that the bicycle stopped before the bicycle turns off the roadway, and set the second distance to a second value in response to a determination that the bicycle did not stop before the bicycle turns off the roadway, wherein the first value is different from the second value.

4. The system in accordance with claim 3, wherein the first value is greater than the second value.

5. The system in accordance with claim 1, wherein the controller circuit is configured to determine a path deviation from a straight line by the bicycle, and increase the second distance in response to a determination that the path deviation is greater than a deviation threshold.

6. The system in accordance with claim 1, wherein the controller circuit is configured to determine a gaze direction of an operator of the bicycle, and increase the second distance in response to a determination that the gaze direction is characterized as not looking forward.

7. A controller circuit for operating a vehicle, said controller circuit comprising:
   an input configured to communicate with an object detector used to track an object traveling on a roadway traveled by a host vehicle; and
   a processor in communication with the object detector, said processor configured to track a position of the object, determine a classification of the object in accordance with a signal received from the object detector, wherein the classification comprises a car and a bicycle, said processor configured to track the car a first distance after the car turns off the roadway, track the bicycle a second distance after the bicycle turns off the roadway, wherein the second distance is greater than the first distance; and
   an output configured to communicate with vehicle controls that operate the host vehicle in accordance with the position of the object; wherein the processor is configured to operate the host vehicle in accordance with a presumption that the bicycle will turn around and re-enter the roadway before the bicycle travels the second distance after the bicycle turns off the roadway,
   wherein the processor is further configured to operate the host vehicle to leave space for the bicycle to re-enter the roadway ahead of the host vehicle.

8. The controller circuit in accordance with claim 7, wherein the processor is configured to wait to enter an intersection until after the bicycle travels the second distance away from the intersection when the bicycle turns off the roadway at the intersection.

9. The controller circuit in accordance with claim 7, wherein the processor is configured to set the second distance to a first value in response to a determination that the bicycle stopped before the bicycle turns off the roadway, and set the second distance to a second value in response to a determination that the bicycle did not stop before the bicycle turns off the roadway, wherein the first value is different from the second value.

10. The controller circuit in accordance with claim 7, wherein the first value is greater than the second value.

11. The controller circuit in accordance with claim 7, wherein the processor is configured to determine a path deviation from a straight line by the bicycle, and increase the second distance in response to a determination that the path deviation is greater than a deviation threshold.

12. The controller circuit in accordance with claim 7, wherein the processor is configured to determine a gaze direction of an operator of the bicycle, and increase the second distance in response to a determination that the gaze direction is characterized as not looking forward.

13. A method of operating a vehicle, said method comprising:
   tracking, using an object detector, an object traveling on a roadway traveled by a host vehicle;

determining, using a processor, a classification of the object in accordance with a signal received from the object detector, wherein the classification comprises a car and a bicycle;

determining that the object has turned off the roadway traveled by the host vehicle;

tracking the object a travel distance after the object has turned off the roadway, wherein the travel distance is first distance when the object is the car and a second distance greater than the first distance when the object is the bicycle;

operating the host vehicle in accordance with the position of the object; wherein operating the host vehicle in accordance with the position of the object includes operating the host vehicle in accordance with a presumption that the bicycle will turn around and re-enter the roadway before the bicycle travels the second distance after the bicycle turns off the roadway; and operating the host vehicle to leave space for the bicycle to re-enter the roadway ahead of the host vehicle.

14. The method in accordance with claim 13, wherein operating the host vehicle in accordance with the position of the object includes waiting to enter an intersection until after the bicycle travels the second distance away from the intersection when the bicycle turns off the roadway at the intersection.

15. The method in accordance with claim 13, wherein operating the host vehicle in accordance with the position of the object includes setting the second distance to a first value in response to a determination that the bicycle stopped before the bicycle turns off the roadway, and setting the second distance to a second value in response to a determination that the bicycle did not stop before the bicycle turns off the roadway, wherein the first value is different from the second value.

16. The method in accordance with claim 15, wherein the first value is greater than the second value.

17. The method in accordance with claim 13, wherein the method includes determining a path deviation from a straight line by the bicycle; and increasing the second distance in response to a determination that the path deviation is greater than a deviation threshold.

18. The method in accordance with claim 13, wherein the method includes determining a gaze direction of an operator of the bicycle; and increasing the second distance in response to a determination that the gaze direction is characterized as not looking forward.

* * * * *